United States Patent [19]

Rankine et al.

[11] 3,854,876

[45] Dec. 17, 1974

[54] METHOD FOR MONITORING AND CONTROLLING THE EFFICIENCY OF A CHEMICAL PROCESS

[75] Inventors: Robin Patrick Rankine; David George Earl; Roger Mellor, all of Calgary, Alberta, Canada

[73] Assignee: Western Research & Development Ltd., Calgary, Alberta, Canada

[22] Filed: Aug. 7, 1972

[21] Appl. No.: 278,241

[52] U.S. Cl............ 23/230 R, 23/230 A, 23/253 A, 23/253 R, 423/574
[51] Int. Cl....................... G01n 21/34, G01n 31/12
[58] Field of Search........ 23/230 R, 230 A, 230 PC, 23/253 R, 253 A; 423/573, 574, 575, 576

[56] References Cited
UNITED STATES PATENTS

| | | |
|---|---|---|
| 2,737,450 | 3/1956 | Morningstar........................ 423/576 |
| 3,026,184 | 3/1962 | Karasek............................ 23/255 E |
| 3,312,529 | 4/1967 | Evano............................. 423/576 X |

Primary Examiner—Joseph Scovronek
Assistant Examiner—Michael S. Marcus
Attorney, Agent, or Firm—Ernest Peter Johnson

[57] ABSTRACT

A sample of the tail gas from a Claus plant is continuously taken, oxidized to convert all C and S atoms to $CO_2$ and $SO_2$ respectively, analyzed for these compounds, and the ratio of $CO_2/SO_2$ (which is numerically equal to the C/S ratio) is determined. The C/S ratio is a measure of the relative flow rates in the tail gas of these two atomic species. Any controllable variable in the plant process can then be optimized by altering it to maximize this ratio.

11 Claims, 2 Drawing Figures

METHOD FOR MONITORING AND CONTROLLING THE EFFICIENCY OF A CHEMICAL PROCESS

BACKGROUND OF THE INVENTION

This invention relates to a method and system for monitoring and controlling the operation of a chemical process.

The invention was developed for the Claus chemical process, or modifications thereof, which is primarily used to produce elemental sulphur from a gas stream known as "acid gas." It will be described in the context of the Claus process; however, as discussed herein below, the invention can be applied to other chemical processes.

The primary use of the Claus process is to treat the acid gas stream from a sour natural gas sweetening plant. The acid gas stream composition can vary widely from plant to plant depending on the natural gas composition, the sweetening plant operation conditions, and other variables. For purposes of illustration, an acid gas composition might comprise 48% hydrogen sulphide and 50% carbon dioxide, with the balance being a mixture of hydrocarbons (e.g. methane and ethane), carbon disulphide, water vapour, mercaptans and other trace components. In the first step of the process, the acid gas is wholly or partly oxidized in an oxidation unit as represented by the following reaction:

$$H_2S + 3/2\ O_2 \rightarrow H_2O + SO_2 \tag{1}$$

This reaction is carried out to oxidize sufficient of the hydrogen sulphide so that the hydrogen sulphide remaining and the sulphur dioxide present will react to give a maximum yield of elemental sulphur as represented by the following reaction:

$$2H_2S + SO_2 \rightarrow 2H_2O + 3/e\ S \tag{2}$$

where $e$ is the average number of atoms in a molecule of elemental sulphur. Reaction (2) is primarily carried out in one or more catalytic stages with a means of condensing sulphur and reheating the gas between each catalytic stage.

A number of side reactions take place during the oxidation step. For example, the hydrocarbons, mercaptans and carbon disulphide consume oxygen duringn combustion. In addition, reactions forming carbonyl sulphide and carbon disulphide also occur as illustrated in the following reactions:

$$CO_2 + H_2S \rightarrow COS + H_2O \tag{3}$$

$$CO_2 + 2H_2S \rightarrow CS_2 + 2H_2O \tag{4}$$

A portion of the carbonyl suphide and carbon disulphide, formed as illustrated in equations (3) and (4), will further react with sulphur dioxide as is illustrated in the following reactions:

$$2COS + SO_2 \rightarrow 2CO_2 + 3/e\ Se \tag{5}$$

$$CS_2 + SO_2 \rightarrow CO_2 + 3/e\ Se \tag{6}$$

The relative quantities of hydrogen sulphide and sulphur dioxide change in the process because of the above side reactions and, in many cases, because of the use of in-line burners burning acid gas or the bypass of a portion of the hot effluent gases from the oxidation process.

The tail gas therefore comprises a mixture of the products of the various reactions occurring in the process. Its composition might comprise 0.7% hydrogen sulphide, 0.6% sulphur dioxide, 0.4% carbon disulphide, 0.1% carbonyl sulphide, 33.0% carbon dioxide, 0.5% sulphur and the balance being mainly nitrogen and water vapor.

Much effort has been spent in developing techniques for: (1) optimizing the operating conditions of the Claus process; (2) monitoring the efficiencies of sulphur recovery and sulphur conversion; and (3) keeping a record of sulphur emission for environmental purposes.

Optimization practices are usually based on measuring the $H_2S/SO_2$ ratio in the tail gas and then adjusting the air input to the oxidation unit to try to bring the ratio to as close to 2/1 as possible. This approach has several shortcomings. Firstly, the system can only be used to control one variable in the plant, i.e. the total air input which may be distributed to the process at several stages. It cannot be used to control variables such as the temperature of the converter catalyst beds or the operating temperatures of the sulphur condensers. Secondly, the ratio is not indicative of the efficiency of sulphur recovery from the process. If the process is operating at 95% efficiency, it is possible for the tail gas $H_2S/SO_2$ ratio to be 2/1 but this ratio can be maintained at 2/1 and yet the catalyst may become so degraded that the efficiency is only 90%. Thirdly, there is increasing doubt that a 2/1 ratio is the optimum and that, because of operating conditions, the optimum ratio may vary from plant to plant and with changes in operating conditions. Fourthly, whatever the optimum ratio of the plant overall, the optimum for each component of the process will not be the same. Finally, in most cases, the ratio data is received on an intermittent and delayed basis due to the limitations of the equipment in commercial use.

Efficiency monitoring practices are usually based on measuring the acid gas composition and flow rate, and the sulphur output. This information is used to calculate the efficiency of the plannt using mass balance equations. However, this practice also has shortcomings. For example, the feed composition is determined using a gas chromatograph; its readings are intermittent and delayed. In addition, the sulphur output flow rate cannot be established as accurately as is desirable.

Sulphur emission monitoring practice is based on analyzing the stack gas effluent from the plant. This involves sampling of the incinerated tail gas at a point up the stack, determining the flow rate through the stack utilizing velocity, temperature and pressure sensors, and analyzing the sample for sulphur compounds. This method is somewhat inaccurate as the flow readings are difficult to establish. Often, more than one sulphur recovery plant will feed into one stack so that it is not possible to determine the sulphur emission of individual plants from an analysis of stack conditions.

SUMMARY OF THE INVENTION

With the foregoing in mind, it is one object of this invention to provide a monitoring method which can be used to provide guidance in altering any controllable variable of a chemical process, such as the Claus process, so as to optimize the effect of that variable on the process.

It is another object to provide a monitoring method which gives a measurement of the efficiency of production or production recovery of a chemical process.

It is another object to provide a monitoring method which uses analytical means alone to provide optimization or efficiency information, whereby one is freed from the prior art need to assemble operating data or develop mathematical or chemical models of the process.

It is another object to provide a method which utilizes: (1) the so determined efficiency of production recovery (or conversion) of a particular chemical substance, such as sulphur, and (2) a knowledge of the inlet flow rate and feed composition to determine the rate of production of the chemical substance or the rate of loss of it (e.g. emission of sulphur dioxide from the stack of a Claus plant).

It is another object to provide a system which can be used to accurately, quickly, and continuously provide optimization, efficiency, production or emission information.

These and other objects of the invention will be apparent from consideration of the following specification.

For purposes of this specification, the following terms have the following meanings:

Flow rate means atoms per unit time unless qualified by a term such as "volume" or "mass." Chemical substance means a chemical element or a chemical compound.

Ratio of Concentrations of Two Chemical Compounds means the ratio of the number of molecules per unit volume of one chemical compound to the number of molecules per unit volume of the other chemical compound in the same stream. This first ratio is used to provide a second ratio of the number of atoms of the two chemical elements in accordance with the following examples:

a. in the case where the chemical compounds being measured are $CO_2$ and $SO_2$, the first ratio is numerically equal to the second ratio; and b. in the case where the chemical compounds being measured are $H_2O$ and $SO_2$, the first ratio, $H_2O/SO_2$, must be multiplied by a factor of 2 to provide the second ratio, H/S, since the number of atoms of hydrogen per molecule of water is twice the number of atoms sulphur per molecule of sulphur dioxide.

Efficiency of Production Recovery is the fraction of the theoretical maximum quantity of the chemical substance which is produced by the chemical process and which is recovered in the required form of that substance.

Efficiency of Production is the fraction of the theoretical maximum quantity of the chemical substance which is produced by the process but which is not necessarily recovered.

The Chemical Process may be the complete process or a component section of the complete process.

A Controllable Variable is an operating condition in the process which can be altered and which affects the magnitude of the parameter described herein below.

The Outlet of the Chemical Process is one or more outlets containing one or more reaction products of the process, but does not include an outlet which contains substantially only the chemical substance in a form such that it has been recovered from the process, as illustrated in the following example:

In the modified Claus process for the recovery of elemental sulphur from sulphur gases, sulphur, the chemical substance of the process, is recovered by a condensation method and is run into vats in the liquid form. These outlets of liquid sulphur are not outlets included in the term "outlet of the chemical process," because the chemical substance has been recovered in the required form from outlets which contain the chemical substance substantially alone.

The invention is based on the conCept of: (1) continuously and quantitatively determining the relative amounts of two atomic species, which are constituents of one or more chemical compounds present in the tail gas, one such component being a reference atomic species which enters the chemical process with the inlet streams and leaves in its entirety in the non-product stream or outlet of the chemical process (an example from the Claus process would be carbon), and the other component being an atomic species which forms all or part of the chemical substance (i.e. sulphur), to provide a measure of the relative flow rates of the two species in the outlet from the process; and (2) using this information for optimizing any of the controllable variables in the chemical process, with a view to producing an extremum quantity (i.e. a maximum or minimum quantity within the limits placed on the process by the equipment and operating conditions) of the chemical substance, or determining the efficiencies of production or production recovery of the process.

In the particular case of the Claus process, the invention can be practised by obtaining a representative sample of the process tail gas (i.e. the stream passing through the outlet of the chemical process), oxidizing all the carbon and sulphur atoms to carbon dioxide and sulphur dioxide respectively, analyzing the sample for these compounds, and determining the ratio of the concentrations of carbon dioxide and sulphur dioxide in the sample, which ratio is numerically equal to the ratio of the flow rates of carbon atoms and sulphur atoms in the tail gas. This C/S ratio is a measure of the relative flow rates in the tail gas of these two atomic species. It can be used as a guideline for optimizing a controllable variable in the process by altering the variable until the C/S ratio is a maximum, at which time the sulphur content of the tail gas will be a minimum and the recovery of the chemical substance (i.e. elemental sulphur) will be a maximum.

The aspect of using a reference atomic species as part of the technique merits amplification. For a particular flow rate of sulphur atoms into the chemical process, the smaller the flow rate of sulphur atoms in the tail gas, the greater will be the fraction of sulphur recovered. Put another way, when the flow rate of sulphur atoms in the tail gas is at a minimum, the sulphur recovery will be a maximum. The monitoring of the flow rate of sulphur atoms, which is necessary to establish that minimum, has heretofore been a difficult and inaccurate procedure requiring the measurement of the volume flow rate at the outlet of the chemical process and a knowledge of the concentrations of all chemical compounds containing sulphur. The requirement for making these two measurements can be overcome by use of a reference atomic species, such as carbon, which has a constant flow rate throughout the system. If the ratio of flow rates of carbon atoms to sulphur atoms in the tail gas increases, this means that the flow rate of sulphur atoms in the tail gas must be decreasing and vice versa. Therefore, when the ratio of flow rates of carbon atoms to sulphur atoms reaches a maximum as a result of adjusting a controllable process variable, that variable will be at an optimum value for the purpose of maximizing elemental sulphur recovery. In the alternative, the invention can be employed to minimize the production of a chemical substance by maximizing the flow rate of the chemical substance species relative to the flow rate of the reference atomic species. Thus, the invention can be used to control an adjustable variable to cause the chemical process to produce an extremum quantity of the chemical substance.

In the event, for example, that the feed composition to the chemical process varies substantially, the the ratio C/S at the process outlet will also vary. In this circumstance, it is preferable to measure both the ratio C/S at the inlet of the chemical process (R in) and the ratio C/S at the outlet of the chemical process (R out), and then determine the ratio R in/R out. This latter ratio is a measure of the mass fraction of sulphur not recovered by the chemical process. Therefore. if one minimizes this ratio by adjusting a controllable variable in the chemical process, the elemental sulphur recovery will be such that the controllable variable decreases the sulphur recovery to the least possible extent.

Where R in is determined at the inlet to the plant, as would be the case if determining, for example, the efficiency of production recovery of a complete Claus process unit, the use C/S ratio has an added advantage. In the Claus process all the carbon and sulphur atoms substantially enter the process in the acid gas feed. It is possible therefore, to determine R in from the acid gas feed alone and there is no necessity to undertake any measurement on the air flow. Where a reaction furnace is used as the oxidation unit, because substantially all the carbon and sulphur atoms entering the furnace leave from it, R in can be determined at the outlet of the reaction furnace.

If, for example, the efficiency of production recovery of sulphur is to be measured for a single converter, the determination of R in should be made using a knowledge of the geometry of the system to ensure that R in is truly representative of the inlet C/S ratio. This is particularly necessary where in-line acid gas burners and by-pass systems are used.

As described, the R out can be used as a guideline for optimizing controllable variables to cause the chemical process to produce an extremum quantity of the chemical substance; the ratio R in/R out can also be used in the same manner, but has added flexibility in that it can be used as a guideline for the production of a predetermined quantity of the chemical substance between these maximum and minimum quantities. In addition, once the ratio R in/R out, (i.e. the fraction of sulphur not recovered), is known, the mass fraction of sulphur recovered, the efficiency of production recovery, can be easily calculated by subtracting from unity.

The fraction of sulphur not recovered may be used in conjunction with a knowledge of the inlet flow conditions to determine the volume or mass flow rate of sulphur or sulphur compounds emitted to the atmosphere as a result of the incomplete recovery of sulphur in that particular chemical process. Normally, the tail gases are oxidized in an incinerator before they are emitted to the atmosphere. The non-recovered sulphur is emitted largely as $SO_2$ and the mass or volume flow rate of $SO_2$ is of prime importance as an indication of the atmospheric pollution caused by the process.

If the variable being optimized is a converter temperature and a decrease in temperature results in a decrease in efficiency of sulphur recovery, then it becomes obvious that an increase in temperature will probably increase the efficiency. The temperature could then be increased until any further increase does not improve the efficiency or decrease it. One particular application for control on the sulphur plant is the air to acid gas mass flow rate ratio, but this involves a different operating concept from the example just given. If the air to acid gas mass flow rate ratio ceases to be an optimum, there will be a decrease in the efficiency of sulphur recovery. This could occur either because there is excess air or because there is deficient air. In order that optimization of this ratio may be accomplished as quickly as possible, it is necessary to determine whether the air/acid gas mass flow rate ratio should be increased or decreased. This information is usually available from the concentration in the conditioned sample of the carbon dioxide, providing that the ratio of volume flow rates of the oxygen in the conditioning system and the sample from the tail gas remains substantially constant. Because the carbon atoms are substantially a component of the acid gas feed alone, a decrease in the carbon dioxide concentration will indicate an increase in the air relative to the acid gas and vice versa.

The invention is characterized by several advantages. More particularly, the system continuously, quickly and accurately supplies informatin which can be used as a guideline in optimizing any controllable variable in the chemical process so as to maximize production. It further provides a quantitative measurement which can be used in the calculations of efficiencies and emission rates. Finally, it provides a warning of an upset in the process which can be corrected manually or automatically.

DESCRIPTION OF The PREFERRED EMBODIMENT

A specific embodiment of the invention using the carbon/sulphur ratio in the tail gas of a Claus process will now be described for the purposes of illustration, but not of limitation with reference to the accompanying drawings.

Figure 1:
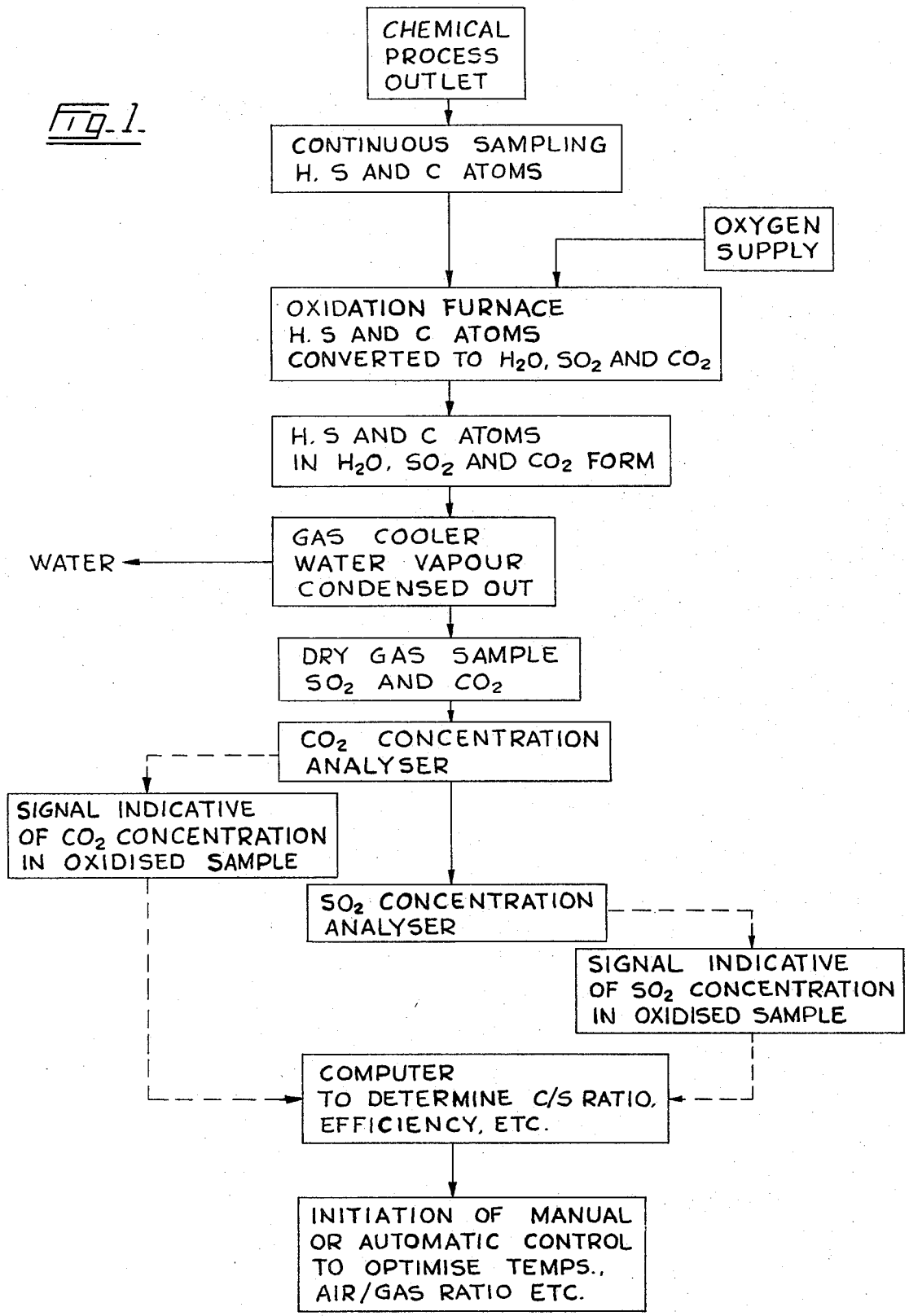
FIG. 1 is a block diagram showing the steps of the method.
Figure 2:
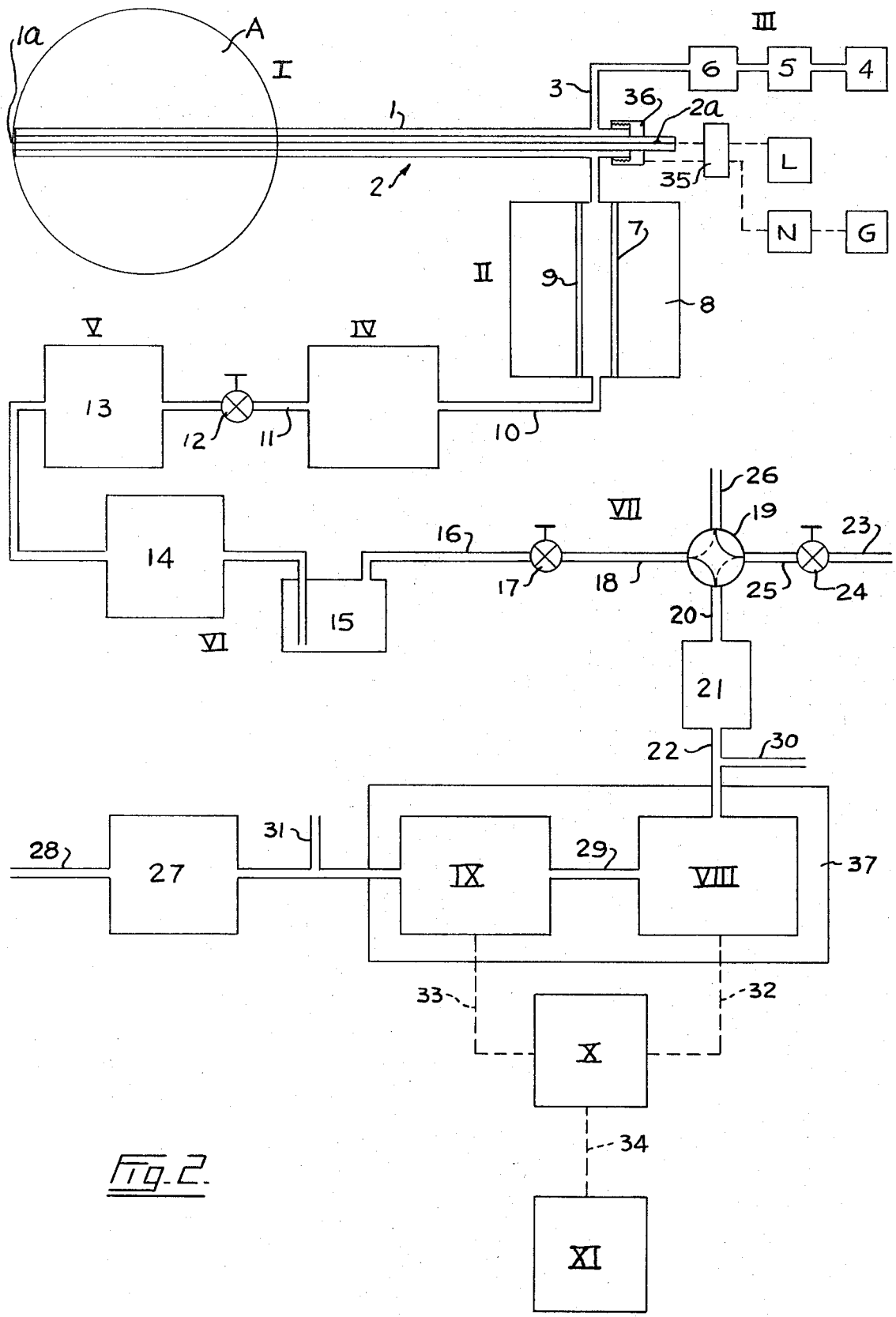
FIG. 2 is a schematic diagram representing the parts of the inventive system.

A system for carrying out the method of the invention is shown in FIGS. 1 and 2. In general, it comprises: a sampling unit I taking a representative sample of the tail gas; an oxidation unit II for chemically treating the tail gas to convert substantially all the carbon, sulphur and hydrogen atoms to carbon dioxide, sulphur dioxide and water respectively; an oxygen flow rate control unit III for supplying oxygen to the oxidation unit; a refrigeration unit IV for removing water from the oxidized sample; a pump and flow control unit V; a particulate filter and liquid trap unit VI; a valving unit VII; an analyzing unit VIII for continuously measuring the carbon dioxide concentration of the sample and emitting an electrical signal proportional thereto; an analyzer unit IX for continuously measuring the sulphur dioxide concentration in the sample and emitting an electrical signal proportional thereto; an analogue computer unit X for receiving the signals from the analyzers and processing the information to give the desired ratio, efficiency or emission output; and a recorder unit XI for recording the computer output.

SAMPLING UNIT

The sampling unit I includes a tube 1, sealed at the inner end 1a. The tube 1 projects inwardly through the wall of the tail gas line A and extends across its full diameter. The portion of tube 1 which extends inside the tail gas line A is perforated such that a substantially representative sample of the effluent gas that flows in tail gas line A can be drawn out through tube 1. A sealed heating unit 2 is mounted within the tube 1 and extends its full length. This heating unit functions to heat the gas sample from its normal level of approximately 300°F in the tail gas line A to between 500°F and 900°F; at these temperatures the liquid sulphur collected by the probe is substantially all vapourized and thus will not plug the sampling unit. In addition, this heating operation prevents the condensation of water and sulphur vapour in the probe unit I.

Structurally, the heating unit 2 comprises a resistance wire 2a extending the full length of the inner tube 2 which is also enclosed at its inner end 1a, and being fused thereto at the inner end 1a so as to provide an electrical connection therewith. The wire 2a is electrically insulated along its full length from inner tube 2 by a sheath of woven glass insulation. Both tubes 1 and 2 are in contact at their outer ends with a locking nut 36, which is grounded electrically such that tubes 1 and 2 are also electrically grounded. The electrical resistance wire 2a is connected via a variable transformer 35, to a voltage source so that its temperature can be increased or decreased as required. The voltage source used was the normal 110 volt alternating current domestic supply. The pin 3 male electrical connector connected to the sampling unit I is wired so that the neutral terminal was solidly grounded. This was undertaken by connecting the neutral (N) and ground (G) terminals in the socket as illustrated in FIG. 2. The resistance wire was connected to the live (L) terminal and the locking nut 36 was connected to the neutral terminal (N). Typically, the voltage used was 60 volts to an electrical resistance wire enclosed in a woven glass fibre sheath which was obtained from Hotwatt Incorp. of Danvers, Mass.; the energy produced is approximately 5 watts per inch of 110 volts.

The tube 1 and heating unit 2 are suitably made of 316 stainless steel. Typically the tube is one-half inch O.D. and has a 0.0035 inch thick wall; the heating unit tube 2 is one-fourth inch O.D. and also has a 0.0035 inch thick wall.

Care should be exercised to maintain the temperature within the annular space between tubes 1 and 2 below that temperature at which the significant reaction occurs between the gas and the tubes. By way of example, the minimum temperature to prevent condensation has been found on occasion to be about 300°F while the temperature at which significant reaction occurred was about 650°F.

OXIDATION AND OXYGEN FLOW CONTROL UNITS

The flow control unit III functions to supply oxygen to the reaction zone of the oxidation unit II. The oxygen is usually supplied in an amount sufficient to provide about a 7 percent excess over that required to satisfy the stoichiometric requirements of the oxidation reactions referred to previously.

In terms of structure, unit III, comprises an oxygen supply, 4, regulated to 60 psig outlet pressure. The oxygen flow is controlled by a Brooks model 8744 flow controller, 5, and is measured by a rotameter, 6, which is a Brooks E/C meter model 1555–V.

The sample gas from the sampling unit I, and the oxygen are fed into the reaction tube 7 of the oxidation unit II. The reaction tube 7 extends through a heating furnace 8. The furnace, 8, is operated at a temperature of about 800°C to 1000°C to facilitate the oxidation process.

A satisfactory embodiment of unit II comprises a model 54372 Lindberg tube furnace, 8, having an internal diameter of about 2½ inches and a heated length of 24 inches. The reaction tube comprises a 1¼ inch outside diameter 310 stainless steel tube 7, of 30 inches length having its interior surface lined by a 1 inch outside diameter Vycor liner tube, 9. The Vycor liner tube is of 1½ millimeter wall thickness and is filled with 5 inch long 7 millimeter and 4 millimeter diameter Vycor tubes. The furnace is operated typically to maintain a temperature from 850°C at the inner surface of its refractory lining. Care should be taken to avoid operating the furnace at such a high temperature as to promote the reaction between the gases and the steel tube since scaling will result and sulphur trioxide will be produced. The vicor tubing helps to minimize these undesirable reactions and is sealed as well as is possible to prevent gases entering the annulus between the vicor tubing, 9, and the stainless steel tube, 7.

The reaction product gases pass from the oxidation unit II into the refrigeration unit IV through line 10. This line is heated to maintain the temperature of the gases above the water dew point. Vycor is a registered trade mark.

REFRIGERATION UNIT

The reaction gases are cooled in the refrigeration unit IV to a near constant temperature of between 0°C and 2°C so as to condense the water vapour in the gases. This water separates from the gas by gravity to leave a dry product. The water is collected in reservoirs in the base of the unit. We have found an electric gas cooler model 7865–22, manufactured by Intertech Corp., to be suitable for this function.

PUMP AND FLOW CONTROL UNIT

The dry gas from the refrigeration unit IV passes through line 11 to the pump and flow control unit V.

A suitable unit V comprises a flow control valve, 12, manufactured by Whitey catalogue number 1RS4, and a diaphram pump, 13, model G-3, manufactured by Air Controls Incorp. The gas leaving the pump, 13, goes through unit VI which comprises a particulate filter, 14, and liquid trap, 15, to clean up any remaining solids and liquid which would foul the analytical units and cope with a system malfunction upstream, such as the loss of oxygen supply which might result in sulphur vapour passing through the oxidation furnace without being oxidized.

VALVING UNIT

The dry gas passes from the liquid trap, 15, through line 16 and flow control valve 17 to the valving unit VII. This unit, VII, is provided so that, at any time during the operation of the system, the oxidized gas may be bypassed around the analytical system and a flow of zero or calibration gas may be introduced to the analytical units VIII and IX. Nitrogen or air may be used as a zero gas for this purpose, a calibration gas is a mixture of nitrogen, carbon dioxide and sulphur dioxide, such that the composition of the span gas is known accurately.

One suitable arrangement and its operation is now described. With valve 19, a Whitey four way stainless steel ball valve, catalogue number 43YF2-316, set as indicated by the continuous lines in FIG. 2, (normal operating position), the oxidized gas sample from line 18 passes through valve 19 and line 20 to the analyzer units VIII and IX via a Brooks unit 1350 rotameter, 21, and line 22. Line 23 connects via valve 24, which is the same as valves 12 and 17, and line 25 to line 26 which is vented external to the system. With the valve 19 in the position indicated by the dotted lines in FIG. 2, the oxidized gas sample in line 18 passes through valve 19 into line 26 which is vented as mentioned above. Line 23, which may pass either zero gas or calibration gas, is connected to line 20 via valve 24, which is the same as valves 12 and 17, and line 25 and then to the analyzer units VIII and IX. With zero gas passing through line 23 and valve 19, in the position indicated by the dotted lines in FIG. 2, the analyzer units VIII and IX are adjusted such that their output signal is zero. With calibration gas passing through line 23 and valve 19 in the dotted line position, the analyzer units VIII and IX are adjusted such that their output signals correspond to the concentration of carbon dioxide and sulphur dioxide in the calibration gas, respectively.

ANALYZER UNITS

The dry sample gas leaving the valving unit VII, passes through the analyzer unit VIII, where its carbon dioxide concentration is measured, and the analyzer unit IX, where its sulphur dioxide concentration is measured.

More specifically, gas enters a Uras-2 Model 5611-200 analyzer, VIII, manufactured by Intertech Corp., which measures carbon dioxide concentration by infra-red absorption and emits a signal indicative thereof. The gas then leaves the analyzer VIII and enters a DuPont Series 400 Photometric analyzer IX which measures its sulphur dioxide concentration by ultra-violet absorption and emits a signal indicative thereof. From analyzer IX, the gas passes through oxygen analyzer 27 and is vented to atmosphere through line 28. The analyzer 27, described in bulletin 4106 of Beckman Instruments Incorp., operates to provide a warning if there is a deficiency or greater than required excess in the amount of oxygen supplied to the oxidation unit II.

The cell of the two analyzers, units VIII and IX, are both housed in the same enclosure 37, i.e. the thermostatically controlled compartment of the $CO_2$ analyzer. The ultra-violet light source for the $SO_2$ analyzer is mounted on the side of the $CO_2$ analyzer and is positioned such that the light passes through an aperture in the casing of the $CO_2$ analyzer into the cell. A correspondingly placed aperture on the opposite side of the $CO_2$ analyzer allows the light to pass into the remainder of the $SO_2$ analyzer which comprises the sensors and electronic signal conditioner circuitry. In this manner, the length of line 29 is reduced to a minimum because of the closeness of the cells to one another. This also reduces the pressure drop between the cells and it is then possible to consider both cell pressures to be equal without incurring anything other than a negligible inaccuracy by this assumption. As both cells are housed in the same thermostatically controlled compartment, the gases are considered to remain at constant and equal temperatures in both cells. Lines 30 and 31 permit static pressure measurements to be made, using conventional U-tube manometers, immediately before the gases enter the $CO_2$ cell and immediately after their departure from the $SO_2$ cell respectively.

The electronic signals from analyzer units VIII and IX, indicative of the concentrations of the $CO_2$ and $SO_2$ respectively, proceed to the analogue computer unit X via electrical connections 32 and 33 respectively, where they are treated to provide a value of R-out, in conjunction with a value of R-in, which is entered manually, the efficiency of the recovery of sulphur is determined and communicated to recorder XI via an electrical connection 34. In this case, the recorder used is a 2-pen Speedomax WL recorder manufactured by Leeds & Northrup, catalogue number 702-30-30-000-000-0044-0044-6-C.

Typical sampling flow rates are between 0.5 scfh and 3 scfh for the sampled gases. Valve 12 is used as a coarse control and valve 17 as a fine control. If the pressure in the tail gas line A is sufficiently high it may not be necessary to use the pump, 13.

The continuous reading of the efficiency of recovery of the sulphur is used to alter a controllable variable in the chemical process to minimize the disparity between the actual quantity of sulphur recovered and the desired quantity thereof.

Where the concentration of either of the two components exceeds the limit of the analyzer, the analyzer should be replaced by one capable of measuring the range of concentrations compatible with that existing in the sample or, where practicable, the sample can be diluted with nitrogen prior to the first analyzer, VIII.

While the invention has been described in terms of measuring the carbon to sulphur flow rate ratio, it will be appreciated that the reference atomic species can be any atomic species which meets the requirements defined above. For example, the above example could be described in terms of the hydrogen to sulphur atom flow rate ratio. In practical terms, this would involve the removal of assembly IV and the replacement of the $CO_2$ analyzer, VIII, with an $H_2O$ vapour analyzer. It would be necessary to maintain the sample above the water dew point until it passes out of the latter of the two analyzers, IX.

We have found quarter inch diameter Teflon (registered trade mark) tubing to be excellent for the transport of gases typically encountered in the tail gas line of sulphur recovery plants and this was used except where otherwise mentioned above.

What is claimed is:

1. A method for monitoring and controlling the production of a chemical substance by a chemical process, which method comprises:

obtaining a sample from an outlet of the chemical process;

chemically treating the sample to convert all the sample components, containing a first chemical element which is also a constituent of the chemical substance, into one chemical compound, without the addition to the sample of said element, and to convert all the sample components containing a second chemical element, which is not a constituent of the chemical substance and the flow rate of which is substantally the same at the outlet of the chemical process as it is at the inlet of the chemical process, into one chemical compound, without the addition to the sample of said second chemical element;

measuring the ratio of the concentrations of the two chemical compounds and determining therefrom a ratio of the number of atoms of the two chemical elements existing in the sample; and altering a controllable variable in the chemical process using the magnitude of the so determined ratio to minimize the disparity between the actual quantity of the chemical substance produced and recovered and the desired quantity thereof.

2. The process as set forth in claim 1 wherein:
the sample is chemically treated by oxidizing it;
the first chemical element is sulphur; and
the second chemical element is carbon.

3. The process as set forth in claim 2 wherein:
the sample is oxidized at a temperature within the range 800°C to 1000°C.

4. A process for monitoring and controlling the production of a chemical substance by a chemical process, which method comprises:

obtaining a first sample from an inlet of the chemical process;

obtaining a second sample from an outlet of the chemical process;

chemically treating each sample to convert all the sample components, containing a first chemical element which is also a constituent of the chemical substance, into one chemical compound, without the addition to the sample of said element, and to convert all the sample components, containing a second chemical element, which is not a constituent of the chemical substance and the flow rate of which is substantially the same at the outlet of the chemical process as it is at the inlet of the chemical process, into one chemical compound, without the addition to the sample of said chemical element;

measuring the ratio of the concentrations of the two chemical compounds and determining therefrom a ratio of the number of atoms of the first and second chemical elements existing in the inlet sample;

measuring the ratio of the concentrations of the two chemical compounds and determining therefrom a ratio of the number of atoms of the same two chemical elements existing in the outlet sample;

where the numerators in the so determined ratios of the inlet and outlet samples pertain to the same chemical element, altering a controllable variable in the chemical process usisng the magnitude of the ratio of the so determined ratios of the two chemical elements at the inlet and outlet of the process to minimize the disparity between the actual quantity of the chemical substance produced and recovered and the desired quantity thereof.

5. The process as set forth in claim 2 wherein:
the sample is chemically treated by oxidizing it;
the first chemical element is sulphur; and
the second chemical element is carbon.

6. The process as set forth in claim 5 wherein:
the sample is oxidized at a temperature within the range 800°C to 1000°C.

7. A process for monitoring the efficiency of production recovery of a chemical substance from a chemical process which comprises:

obtaining a first sample from an inlet of the chemical process;

obtaining a second sample from an outlet of the chemical process;

chemically treating each sample to convert all the sample components, containing a first chemical element which is also a constituent of the chemical substance, into one chemical compound, without the addition to the sample of said particular chemical element, and to convert all the sample components containing a second chemical element, which is not a constituent of the chemical substance and the flowrate of which is substantially the same at the outlet of the chemical process as it is at the inlet of the chemical process, into one chemical compound, without the addition to the sample of said second chemical element;

measuring the ratio of the concentrations of the two chemical compounds in the first sample and determining therefrom a ratio of the number of atoms of the first and second chemical elements existing in the inlet sample;

measuring the ratio of the concentrations of the two chemical compounds in the second sample and determining therefrom the ratio of the number of atoms of the same two chemical elements existing in the outlet sample;

where the numerators in the so determined ratios from the inlet and outlet samples pertain to the first chemical element;

determining the magnitude of the difference between unity and the ratio of the so determined ratio of the two chemical elements obtained from the outlet sample and the so determined ratio of the same two chemical elements obtained from the inlet sample to provide the efficiency of production recovery where the ratio of the two chemical elements obtained from the outlet sample is the numerator of the ratio that is to be subtracted from unity.

8. The process as set forth in claim 7 wherein:
the sample is chemically treated by oxidizing it;

the first chemical element is sulphur; and
the second chemical element is carbon.

9. The process as set forth in claim 8 wherein:
the sample is oxidized at a temperature within the range 800°C to 1000°C.

10. The process as set forth in claim 7 wherein:
the series of steps are carried out substantially continuously.

11. The process as set forth in claim 8 wherein:
the series of steps are carried out substantially continuously.

* * * * *